US007958059B2

(12) United States Patent
de Hilster et al.

(10) Patent No.: US 7,958,059 B2
(45) Date of Patent: *Jun. 7, 2011

(54) SYSTEM AND METHOD FOR INTERACTIVELY ENTERING DATA INTO A DATABASE

(75) Inventors: David Scott de Hilster, Long Beach, CA (US); Alan George Porter, Huntington Beach, CA (US); John Reese, Los Angeles, CA (US)

(73) Assignee: Kenexa Brassring, Inc., Wayne, PA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 11/191,898

(22) Filed: Jul. 28, 2005

(65) Prior Publication Data

US 2005/0262122 A1    Nov. 24, 2005

Related U.S. Application Data

(63) Continuation of application No. 09/948,408, filed on Sep. 6, 2001, now Pat. No. 6,996,561, which is a continuation of application No. 09/456,930, filed on Dec. 7, 1999, now abandoned, which is a continuation-in-part of application No. 09/019,948, filed on Feb. 6, 1998, now Pat. No. 5,999,939.

(60) Provisional application No. 60/068,404, filed on Dec. 21, 1997.

(51) Int. Cl.
    *G06F 17/30*    (2006.01)
(52) U.S. Cl. ........................................ 705/321; 707/602
(58) Field of Classification Search .................. None
    See application file for complete search history.

(56) References Cited

U.S. PATENT DOCUMENTS

| 4,749,875 | A |   | 6/1988  | Hara            |         |
|-----------|---|---|---------|-----------------|---------|
| 5,164,899 | A |   | 11/1992 | Sobotka et al.  |         |
| 5,197,004 | A |   | 3/1993  | Sobotka et al.  |         |
| 5,258,855 | A | * | 11/1993 | Lech et al. ............. | 358/462 |
| 5,315,504 | A |   | 5/1994  | Lemble ............. | 700/90  |
| 5,361,355 | A |   | 11/1994 | Kondo et al. ............. | 717/120 |

(Continued)

FOREIGN PATENT DOCUMENTS

CA    2277261 A    9/1999

(Continued)

OTHER PUBLICATIONS

"Patient Entries in the Electronic Medical Record: An Interactive Interview used in Primary Care", Jonathan S. Wald et al. , 147-151, 1995.*

(Continued)

*Primary Examiner* — Neveen Abel-Jalil
*Assistant Examiner* — Kellye D Buckingham
(74) *Attorney, Agent, or Firm* — Foley & Lardner LLP

(57) ABSTRACT

A system and method for facilitating the accurate entry of information into a highly structured database by initially extracting information from a plurality of nonuniformly formatted source data streams, e.g., documents/files, and subsequent interactions with users before storing the accepted and/or modified information into the database. Embodiments of the present invention provide an interactive path for each user (e.g., the author of the source document/file) to interactively modify the extracted data, e.g., according to the source document/file. Preferably, this interactive path is provided via the Internet and the extracted information can be modified by editing and/or selectively copying portions of the source documents/files to supplement and/or modify the extracted information.

33 Claims, 12 Drawing Sheets

U.S. PATENT DOCUMENTS

| | | | |
|---|---|---|---|
| 5,379,420 A | 1/1995 | Ulner | 707/6 |
| 5,412,384 A | 5/1995 | Chang et al. | 241/79 |
| 5,550,967 A | 8/1996 | Brewer et al. | |
| 5,604,900 A | 2/1997 | Iwamoto et al. | |
| 5,608,904 A | 3/1997 | Chaudhuri et al. | 707/2 |
| 5,664,109 A * | 9/1997 | Johnson et al. | 705/2 |
| 5,675,780 A | 10/1997 | Plant-Mason et al. | 707/6 |
| 5,694,610 A * | 12/1997 | Habib et al. | 715/210 |
| 5,721,827 A | 2/1998 | Logan et al. | |
| 5,732,216 A | 3/1998 | Logan et al. | 709/203 |
| 5,740,425 A | 4/1998 | Povilus | |
| 5,748,975 A * | 5/1998 | Van De Vanter | 715/236 |
| 5,758,126 A | 5/1998 | Daniels et al. | 715/780 |
| 5,758,324 A * | 5/1998 | Hartman et al. | 705/1 |
| 5,806,057 A | 9/1998 | Gormley et al. | |
| 5,809,248 A | 9/1998 | Vidovic | |
| 5,819,301 A | 10/1998 | Rowe et al. | 715/235 |
| 5,832,496 A | 11/1998 | Anand et al. | |
| 5,832,497 A | 11/1998 | Taylor | |
| 5,855,007 A | 12/1998 | Jovicic et al. | |
| 5,857,183 A | 1/1999 | Kableshkov | 707/3 |
| 5,860,067 A * | 1/1999 | Onda et al. | 705/9 |
| 5,864,848 A * | 1/1999 | Horvitz et al. | 707/6 |
| 5,873,056 A * | 2/1999 | Liddy et al. | 704/9 |
| 5,884,309 A * | 3/1999 | Vanechanos, Jr. | 1/1 |
| 5,907,837 A | 5/1999 | Ferrel et al. | |
| 5,937,406 A | 8/1999 | Balabine et al. | |
| 5,973,696 A | 10/1999 | Agranet et al. | |
| 5,987,422 A | 11/1999 | Buzsaki | |
| 5,999,939 A | 12/1999 | de Hilster et al. | |
| 6,018,749 A | 1/2000 | Rivette et al. | 715/202 |
| 6,044,382 A | 3/2000 | Martino | 715/234 |
| 6,047,296 A | 4/2000 | Wilmott et al. | 715/210 |
| 6,078,924 A | 6/2000 | Ainsbury et al. | |
| 6,185,573 B1 | 2/2001 | Angelucci et al. | |
| 6,199,048 B1 | 3/2001 | Hudetz et al. | |
| 6,202,023 B1 | 3/2001 | Hancock et al. | |
| 6,233,618 B1 | 5/2001 | Shannon | |
| 6,246,996 B1 | 6/2001 | Stein et al. | |
| 6,266,659 B1 | 7/2001 | Nadkarni | |
| 6,301,574 B1 | 10/2001 | Thomas et al. | |
| 6,311,164 B1 | 10/2001 | Ogden | |
| 6,321,228 B1 | 11/2001 | Crandall et al. | |
| 6,321,538 B2 | 11/2001 | Hasler | |
| 6,324,538 B1 | 11/2001 | Wesinger et al. | |
| 6,370,510 B1 | 4/2002 | McGovern et al. | |
| 6,381,592 B1 | 4/2002 | Reuning | |
| 6,385,620 B1 | 5/2002 | Kurzius et al. | |
| 6,430,577 B1 | 8/2002 | Hart | |
| 6,658,400 B2 | 12/2003 | Perell et al. | |
| 6,785,679 B1 | 8/2004 | Dane et al. | |
| 6,993,723 B1 | 1/2006 | Danielsen et al. | |
| 6,996,561 B2 | 2/2006 | de Hilster et al. | 707/6 |
| 7,251,658 B2 | 7/2007 | Dane et al. | 707/10 |
| 7,496,518 B1 | 2/2009 | Cayton et al. | |
| 7,505,919 B2 | 3/2009 | Richardson | |
| 2001/0047347 A1 | 11/2001 | Perell et al. | |
| 2002/0002479 A1 | 1/2002 | Almog et al. | |
| 2002/0069080 A1 | 6/2002 | Roy et al. | |
| 2003/0229638 A1 | 12/2003 | Carpenter et al. | |
| 2004/0215623 A1 | 10/2004 | Dane et al. | |

FOREIGN PATENT DOCUMENTS

| | | |
|---|---|---|
| CA | 2277261 | 1/2001 |
| EP | 0 748 095 | 12/1996 |
| JP | 2000-057213 | 1/1900 |
| JP | 2002-024459 | 1/1900 |
| WO | WO-95/24687 | 9/1995 |
| WO | WO95/24687 A1 | 9/1995 |
| WO | WO-01/04811 | 1/2001 |
| WO | WO-01/97086 | 12/2001 |
| WO | WO01/97086 A2 | 12/2001 |

OTHER PUBLICATIONS

Barchilon, "Technology's Impact on Online Resumes", IEEE, 1998, pp. 183-187.

*Brassring Inc.* v. *Interactive Search Inc.*, Complaint, Civil Action No. 00CV11525JLT, filed Jul. 31, 2000 in the United States District Court for the District of Massachusetts, and the Docket relating thereto.

Chabrow, E.R., "Online employment (World Wide Web: job hunting and recruitment applications)," Information Week, Jan. 23, 1995, No. 511, pp. 38-41, 44-45.

Goth et al., "Scarcity of IT Workers is the Mother of Recruiter Innovations", IEEE, 1999, pp. 15-17.

Maltais, "Conducting a Job Search on the Internet", IEEE, 1997, pp. 131-133.

Romei, L.K., "Human Resource Management Keeps Computers Humming (job applications processing)," Managing Office Technology, Nov. 1994, vol. 39, No. 11, pp. 45.

Noah, William W. and Rollin V. Weeks, "TRW: Description of the Deft System as Used for MUC-5," pp. 237-248.

Kennedy, Joyce Lain and Morrow, Thomas, "Electronic Job Search Revolution: Win With the New Technology That's Reshaping Today's Job Market," Published by John Wiley and Sons, Inc., Copyright 1994.

Kennedy, Joyce Lain and Morrow, Thomas, "Electronic Job Search Revolution Second Edition: Win With the New Technology That's Reshaping Today's Job Market," Published by John Wiley and Sons, Inc., Copyright 1995.

Kennedy, Joyce Lain and Morrow, Thomas, "Electronic Resume Revolution Second Edition: Creating a Winning Resume for the New World of Job Seeking," Published by John Wiley and Sons, Inc., Copyright 1995.

Kennedy, Joyce Lain, "Hook up, Get Hired! : The Internet Job Search Revolution," Published by John Wiley and Sons, Inc., Copyright 1995.

*Kenexa Brassring Inc.* v. *Taleo Corporation*, Complaint, Civil Action No. 07CV521SLR, filed Aug. 27, 2007 in the United States District Court for the District of Delaware.

*Kenexa Brassring Inc.* v. *Taleo Corporation*, Answer and Counterclaims, Civil Action No. 07CV521SLR, filed Jan. 28, 2008 in the United States District Court for the District of Delaware.

Sep. 5, 2008 Order Granting Reexam, in Inter Partes Reexamination of US Patent No. 6,996,561; Reexamination Control No. 95001060.

Exhibit A Invalidity Contentions of Taleos in view of US Patent No. 5,864,848 to Horvitz et al.

Exhibit B Invalidity Contentions of Taleos in view of US Patent No. 5,258,855 to Lech et al.

Exhibit C Invalidity Contentions of Taleos in View of Alleged Admissions Made in Reexamination of US Patent No. 5,999,939—de Hilsters Admissions.

Exhibit D Invalidity Contentions of Taleos in View of US Patent No. 5,664,109 to Johnson et al.

Exhibit E Invalidity Contentions of Taleos in View of US Patent No. 5,258,855 to Lech et al in Combination with US Patent No. 5,758,324 to Hartman et al.

Exhibit F Invalidity Contentions of Taleos in View of US Patent No. 5,864,848 to Horvitz et al in Combination with US Patent No. 5,758,324 to Hartman et al.

Exhibit G Invalidity Contentions of Taleos in View of US Patent No. 5,258,855 to Lech and de Hilsters Admissions.

Exhibit H Invalidity Contensions of Taleos in View of US Patent No. 5664109 to Johnson et al in Combination with US Patent No. 5,860,067 to Onda et al.

Exhibit I Invalidity Contensions of Taleos in View of US Patent No. 5664109 to Johnson et al in Combination with US Patent No. 5,758,324 to Hartman et al.

Exhibit J Invalidity Contentions of Taleos in View of US Patent No. 5664109 to Johnson et al in Combination with US Patent No. 5,258,855 to Lech et al.

Exhibit K the Recruiter with IRIS.

Exhibit L Microsoft Outlook 97 for Windows for Dummies alleged to relate to multiple users to access and update a common database over a network copyright 1997.

Taleo Corporations First Supplemental Objections and Responses to Kenexa Brassring Incs Contention Interrogatories CA No. 07 521 SLR.

Taleos Second Production of Alleged Prior Art References Supporting Exhibit K produced Sep. 9, 2008.

Inter Partes Examination Action Closing Prosecution for U.S. Appl. No. 95/001,060 dated Jun. 4, 2009.
Advisory Action dated Nov. 26, 2008 for U.S. Appl. No. 10/655,572.
Browne et al, Location Independent Naming for Virtual Distributed Software Repository, ACM 1995, pp. 179-185.
Inter Partes Examination Action Closing Prosecution for U.S. Appl. No. 95/001,060 dated Jun. 4, 2009.
International Search Report dated Oct. 15, 2002 for PCT/US01/10126.
Interview Summary dated Mar. 18, 2005 for U.S. Appl. No. 09/948,408.
Interview Summary dated Dec. 15, 2009 for U.S. Appl. No. 11/825,654.
Interview Summary dated Dec. 16, 2009 for U.S. Appl. No. 10/655,572.
Keller et al., Zippering: Managing intermitten connectivity in DIANA, ACM, pp. 357-364 1997.
Microsoft Outlook 97—Administrator's Guide (19 pgs).
US Notice of Allowance dated Mar. 15, 2007 for U.S. Appl. No. 10/846,765.
US Notice of Allowance dated Apr. 13, 2005 for U.S. Appl. No. 09/948,408.
US Notice of Allowance dated Aug. 6, 2010 for U.S. Appl. No. 11/825,654.
US Office Action dated Feb. 10, 2006 for U.S. Appl. No. 10/846,765.
US Office Action dated Feb. 19, 2010 for U.S. Appl. No. 10/655,572.
US Office Action dated Mar. 11, 2009 for U.S. Appl. No. 10/655,572.
US Office Action dated May 3, 2005 for U.S. Appl. No. 10/846,765.
US Office Action dated Jun. 16, 2008 for U.S. Appl. No. 10/655,572.
US Office Action dated Aug. 23, 2006 for U.S. Appl. No. 10/846,765.
US Office Action dated Sep. 2, 2009 for U.S. Appl. No. 11/825,654.
US Office Action dated Oct. 26, 2009 for U.S. Appl. No. 10/655,572.
US Office Action dated Nov. 6, 2007 for U.S. Appl. No. 10/655,572.
US Office Action dated Nov. 23, 2004 for U.S. Appl. No. 09/948,408.
US Office Action on dated Mar. 5, 2010 for U.S. Appl. No. 11/825,654.
"Intellimatch Moves Recruiting into the 21.sup.st Century with New Online Matching Technology," Press Release (www2.intellimatch.com/p-reles1.html), Sep. 23, 1996.
"iResumix Provides One-Stop Shopping for Strategic Staffing and Recruiting Needs." Business Wire, Jan. 10, 2000.
"Law Firms Automate Courting Ritual Internet Makes Recruiting Students Easier." Business Wire, Oct. 20, 1998.
History of Patent 5999939.
May 20, 2010 CareerPath_Forges_Strategic Partnership.
Web Service Speeds Resume Sifting.
May 20, 2010 Deposition Transcript—Jeffrey Hunter.
May 20, 2010 Deposition Transcript—Ranjit Padmanabhan.
May 20, 2010 Hunter Exhibit 1 How to use ResumeExpress.
May 20, 2010 Hunter Exhibit 2 JobSeeker.
May 20, 2010 Hunter Exhibit 3 JobSeeker.
May 20, 2010 Padmanabhan Exhibit 1 Cited in *Kenexa* v. *Taleo* 1-07-521SLR.
May 20, 2010 Padmanabhan Exhibit 2 Intellimatch.
May 28, 2010 Deposition Transcript—Zimman, Christopher.
May 28, 2010 Zimman Exhibit 1 *Kenexa* v. *Taleo* 107-521SLR Subpoena.
May 28, 2010 Zimman Exhibit 10 Defendants.
May 28, 2010 Zimman Exhibit 11 Defendants.
May 28, 2010 Zimman Exhibit 12 Defendants.
May 28, 2010 Zimman Exhibit 13 Defendants.
May 28, 2010 Zimman Exhibit 14 Defendants.
May 28, 2010 Zimman Exhibit 15 Defendants.
May 28, 2010 Zimman Exhibit 16 Defendants.
May 28, 2010 Zimman Exhibit 17 Defendants.
May 28, 2010 Zimman Exhibit 18 Defendants.
May 28, 2010 Zimman Exhibit 19 Reslex H.
May 28, 2010 Zimman Exhibit 2 75511534.
May 28, 2010 Zimman Exhibit 20 Check Out C.
May 28, 2010 Zimman Exhibit 21 Dicts C.
May 28, 2010 Zimman Exhibit 22 Qualify C.
May 28, 2010 Zimman Exhibit 23.
May 28, 2010 Zimman Exhibit 24 Reslex C Backup.
May 28, 2010 Zimman Exhibit 25 Reslex-Parse 1.
May 28, 2010 Zimman Exhibit 26 Reslex-Parse 1.
May 28, 2010 Zimman Exhibit 27 Test Main C.
May 28, 2010 Zimman Exhibit 28 First Names.
May 28, 2010 Zimman Exhibit 29 Last Names.
May 28, 2010 Zimman Exhibit 3 HotJobs.
May 28, 2010 Zimman Exhibit 30 Lewis S. Pomerov.
May 28, 2010 Zimman Exhibit 31 Resumes—Lewis S. Pomerov.
May 28, 2010 Zimman Exhibit 4 HotJobs.
May 28, 2010 Zimman Exhibit 5 *Kenexa* v. *Taleo* 07-521 SLR.
May 28, 2010 Zimman Exhibit 6 Defendants.
May 28, 2010 Zimman Exhibit 7 Defendants.
May 28, 2010 Zimman Exhibit 8 Defendants.
May 28, 2010 Zimman Exhibit 9 Defendants.
Jul. 23, 2010 Expert Report of Dr. Martin E. Kaliski, Ph. D Exhibit D.
Jul. 23, 2010 Expert Report of Dr. Martin E. Kaliski, Ph.D Exhibit B.
Jul. 23, 2010 Expert Report of Dr. Martin E. Kaliski, Ph.D Exhibit C.
Jul. 23, 2010 Expert Report of Dr. Martin E. Kaliski, Ph.D Exhibit E.
Aug. 10, 2010 Deposition Transcript—Charanjit Pangali.
Aug. 10, 2010 Pangali Exhibit 1 IntellMatch.
Aug. 10, 2010 Pangali Exhibit 19 Edit Structured Skills and Job Functions.
Aug. 10, 2010 Pangali Exhibit 2 *Kenexa* v. *Taleo* 1-07-521SLR Subpoena.
Aug. 10, 2010 Pangali Exhibit 23 Watson.
Aug. 13, 2010 Supplemental Expert Report Martin Kaliski—Invalidity.
Aug. 18, 2010 Expert Report—Jason H Eaddy re Reliability of Timestamps.
Aug. 18, 2010 Expert Report—Jason H Eaddy re Reliability of Timestamps—Exhibit A.
Aug. 18, 2010 Rebuttal Expert Report—Michael Siegel.
Aug. 18, 2010 Rebuttal Expert Report—Michael Siegel—Exhibit A.
Aug. 24, 2010 Depostion Transcript of Jason Eaddy.
Aug. 25, 2010 Deposition Transcript—Martin Kalisky—Etran.
Sep. 9, 2010 Deposition Transcript—Charanjit Pangali.
Sep. 15, 2010 Declaration of Timothy Capps.
Sep. 15, 2010 Supplemental Rebuttal Expert Report—M. Siegel.
Sep. 15, 2010 Supplemental Rebuttal Expert Report—M. Siegel—Exhibit A.
Oct. 7, 2010 Errata Sheet—Kaliski, Martin.
Oct. 8, 2010 Deposition Transcript—Siegel, Michael.
Oct. 8, 2010 Deposition Transcript—Siegel, Michael—Exhibit 16.
Oct. 14, 2010 DKT 189 Kenexa Motion for Reargument re Court's Limitation re Supplemental Rebuttal Expert Testimony.
Oct. 14, 2010 DKT 189 Kenexa Motion for Reargument re Court's Limitation re Supplemental Rebuttal Expert Testimony—Ex. 1.
Oct. 14, 2010 DKT 189 Kenexa Motion for Reargument re Court's Limitation re Supplemental Rebuttal Expert Testimony—Ex. 2.
Oct. 14, 2010 DKT 189 Kenexa Motion for Reargument re Court's Limitation re Supplemental Rebuttal Expert Testimony—Ex. 3.
Oct. 21, 2010 DKT 196 Kenexa Submission re Testimony of T. Capps.
Oct. 21, 2010 DKT 196 Kenexa Submission re Testimony of T. Capps—Exhibit A.
Oct. 22, 2010 Deposition Transcript—Michael Siegel—Etrans.
Nov. 18, 2010 DKT 213 Order re Claim Construction.
Nov. 18, 2010 DKT 214 Memorandum Opinion re Summary Judgment.
Nov. 18, 2010 DKT 215 Order re Summary Judgment.
Nov. 24, 2010 DKT 216—Exhibit 1. *Kenexa* v. *Taleo*—Civil Action No. 07-521-SLR. Letter to Jay F. Utley.
Nov. 24, 2010 DKT 216—Exhibit 2. Taleo and Vury Disclosure of Claim Terms for Construction and Proposed Constructions. Civil Action No. 07-521 SLR.
Nov. 24, 2010 DKT 216—Exhibit 3. U.S. Appl. No. 90/006,570. Notice of Intent to Issue Ex Parte.
Nov. 24, 2010 DKT 216—Exhibit 4. U.S. Appl. No. 90/006,570—Reexamination of US 5999939. Response Under 37 CFR.
Nov. 24, 2010 DKT 216 Kenexa Motion for Reconsideration of [214] Court Memo Order.
Dec. 8, 2010 DKT 217 Taleo Vurv Oppostion to Motion for Reconsideration.

Barchilon, Technology's Impact on Online Resumes, IEEE, 1998, pp. 183-187.

Borck, James R. "Recruiting systems control resume chaos—A new generation of Web-based solutions streamline the recruiting process, cutting costs and time to hire." InfoWorld, Jul. 24, 2000.

*Brassring Inc.* v. *Interactive Search Inc.*, Complaint, CA No. 00CV11525JLT, filed Jul. 31, 2000 in the United States District Court for the District of Massachusetts.

CareerPath.com. Forges Strategic Partnership with Interactive Search, Inc.

Carpenter et al., Method for providing access to online employment information, USPatent Application Publication, pp. 1-17—See US Publ. No. 2003-0229638.

Chabrow, E.R., Online employment (World Wide Web: job hunting and recruitment applications), Information Week, Jan. 23, 1995, No. 511, pp. 38-41, 44-45.

Exhibit K the Recruiter with IRIS.

Exhibit L Microsoft Outlook 97 for Windows for Dummies alleged to relate to multiple users to access and update a common database over a network copyright 1997.

ExParte re-exam Control No. 90-006570—Dated Mar. 20, 2003.

File History for US Patent 5,864,848.

Goth et al., Scarcity of IT Workers is the Mother of Recruiter Innovations, IEEE, 1999, pp. 15-17.

Hays, Scott, "Hiring on the Web," Workforce, v78n8, pp. 76-84, Aug. 1999.

History of Patent 5999939.

International Search Report dated Oct. 15, 2002 for PCT/US01/10126.

Interview Summary dated Dec. 14, 2009 for U.S. Appl. No. 11/191,898.

*Kenexa Brassring, Inc.* v. *Taleo Corporation*, CA No. 07-521 (SLR), Taleo Corporation's Objections and Responses to Kenexa Brassring, Inc.'s Contention Interrogatories, filed Jun. 27, 2008.

*Kenexa Brassring, Inc.* v. *Vurv Technology, Inc.*, CA No. 08-276, Answer, filed May 29, 2008.

*Kenexa Brassring, Inc.* v. *Vurv Technology, Inc.*, Complaint, filed May 9, 2008.

Kennedy et al, Electronic Job Search Revolution Second Edition: Win With the New Technology That's Reshaping Today's Job Market, Published by John Wiley and Sons, Inc., Copyright 1995.

Maltais, Conducting a Job Search on the Internet, IEEE, 1997, pp. 131-133.

McCune, Jenny C., "A few good employees," Management Review, v87n4, pp. 38-40, Apr. 1998.

Noah et al, TRW: Description of the Deft System as Used for MUC-5, pp. 237-248.

Noah, William W. and Rollin V. Weeks, "TRW: Description of the Deft System as Used for MUC-5," pp. 237-248, Aug. 1993.

Non-provisional of provisional U.S. Appl. No. 60/211,044, filed Jun. 12, 2000. (www.accuhire.com, Retrieved from Internet Archive Way Back Machine <www.archive.org>, includes Website Upload Date stamp Screenshot Jun. 20, 2000).

Romei, L.K., Human resource management: keeps computers humming (job applications processing), Managing Office Technology, Nov. 1994, vol. 39, No. 11, pp. 45.

Rubinstein, Ed, "Operators embrace automated systems to hire the best, reduce turnover," Nation's Restaurant News, v31n25, pp. 71,80, Jun. 23, 1997.

Sheley, E., High Tech Recruiting Methods, copyright 2008 The Gale Group, copyright 2005 Society for Human Resource Management.

Tyler, Kathryn, "Put Applicants' Skills to the Test." HR Magazine, Jan. 2000.

U.S. Non-Provisional of Provisional U.S. Appl. No. 60/204,776, filed May 17, 2000.

US Office Action dated Mar. 8, 2011 for U.S. Appl. No. 10/655,572.

US Office Action dated Aug. 31, 2010 for U.S. Appl. No. 10/655,572.

WebService Speeds Resume Sifting. (Interactive Search uses Relational Database to Simplify Resume-Retrieval Process).

www.Intellimatch.com. Where Jobs and People Meet their Match. May 1997.

* cited by examiner

EXPERIENCE: — 26

24a  24b   24c   24d

11/96 - 7/97 Relocation Assistance Coordinator
Tokyo Central Agency (TGA Inc.) Tokyo, Japan
Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

*Fig. 2.*

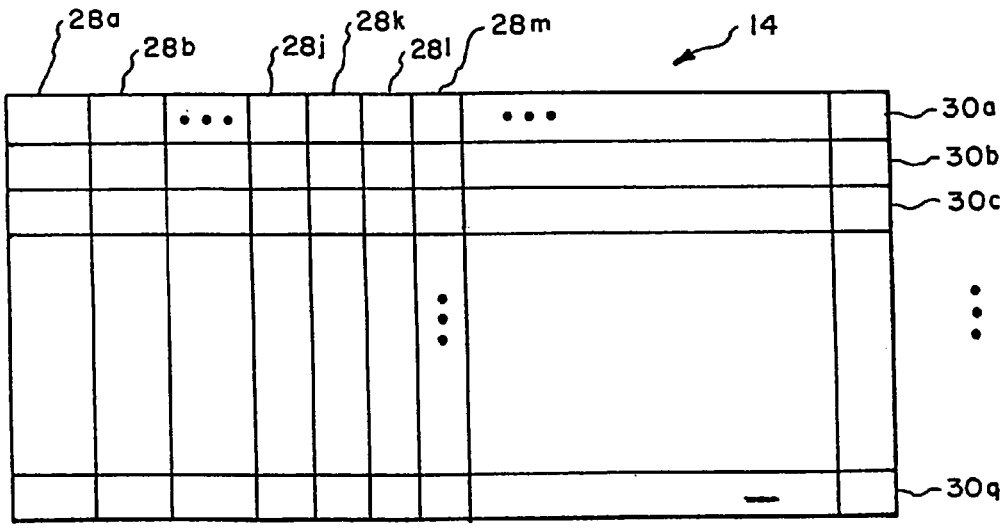

*Fig. 3.*

jobEngine — Post Resume

Help?

This page is for posting a new resume. Click here to Change or Remove a previously posted resume.

Instructions:

There are 3 steps to post your resume:

- Paste in your resume.
- Answer a few questions.
- Review our work to ensure that the information in your resume is correct. Then enroll.

And only a few rules: ⟋ 68

- Items labelled in Red are Required.
- Items labelled in Black are Optional, but we strrongly suggest that you take a few minutes to answer the questions. Your answers provide information, not typically found in a resume, that employers want to know before they contact you.

Don't worry -- nothing will be saved in the database without your review and approval.

STEP ONE -- PASTE IN YOUR RESUME

Copy your resume from a text file on your computer and paste into the text block below.

Be sure your contact information (name, address, phone number(s) and email address) appears only at the top of the resume, and that nothing in the body of your resume (like your current job description) identifies you. This protects your privacy. This step is Required.

⟋ 70

Resume:
```
Arthur Smith
1234 Main Street
Sausalito, California 94965
Tel: 415-555-5432    Fax: 415-555-5543
E-mail: asmith@isp.com

EXPERIENCE:

11/96 - 7/97 Relocation Assistance Coordinator
Tokyo Central Agency (TCA Inc.) Tokyo, Japan
```

*Fig. 6A.* jobEngine — Post Resume
Help?

STEP TWO -- ANSWER A FEW QUESTIONS

There's some additional information, not typically in your resume, that is very helpful to employers. Most of these questions are optional. However, you should try to answer as many as possible. It will only take a few minutes... promise.

／72

Job Goals

Functional Specialties
```
GENERAL MANAGEMENT
  Senior Management (CEO Pres, COO, GM)
  Branch & Regional Management
INFORMATION TECHNOLOGY MANAGEMENT
```
— 82a Type of Position   Full Time  — 82b Expected Compensation   open  — 82c Travel   Moderate (25%-50%)  — 82d Relocation   Yes - I can relocate to:   Areas  most anywhere
— 82e   — 82f

About You

Citizenship   U.S. Citizen   — 82g

Current Clearances   No   — 82h

Enrollment   — 82i

Type
- ⦿ Open - Your full resume, including contact information, will be available to employers.
- ○ Confidential - Your full resume, except your contact information, will be available to employers. Those interested in contacting you can do so via email forwarded to you confidentially.
- ○ Private - No employer can see your resume. It is retained in jobEngine's Resume Center as a convenience to you when applying to jobs.

[Ready for Step 3!]   [Start Over]

---

Comments, questions or suggestions? Please email us at support@jobEngine.com

— A ZDNet and I-Search Site —

 Copyright (c) 1997 jointly by Ziff-Davis (ZDNet) and Interactive Search (I-Search) All rights reserved. jobEngine and "Matchmakers for IT Professionals" are joint service marks of Ziff-Davis and 

Fig. 6B.

jobEngine

Post Resume

STEP 3 -- REVIEW INFORMATION AND ENROLL

Help?

We know you hate to enter again what you have already put into your resume. So, we've tried first to fin information we need. Please review the information carefully and correct errors. A copy of your resum included for copying and pasting as needed. This is an important step. Remember -- items labeled in Re Required.

Be sure to scroll through all the data in this window, make all needed corrections, select a Resu Access Code and password, and then Post your resume.

Contact Information (confidential)

| Field | Value | | |
|---|---|---|---|
| Name | Arthur | Smith | |
| Address | 1234 Main Street | | |
| | | | |
| City, State Zip | Sausalito | California | |
| | 94965 | | |
| Country | USA | | |
| Phone | Home 415-555-5432 | Work | Fax 415-555-55 |
| Email | asmith@isp.com | | |
| Web Page | | | |

Experience

Your three most recent positions. The order of jobs is not important. For each job entered, information is in each of the four columns with red labels.

| Start Date | End Date | Company | Title |
|---|---|---|---|
| 11/96 | 7/97 | TGA Inc. | Relocation Assistan |
| 3/95 | 10/96 | NCR English Language Inst | English Teacher |
| 8/94 | 2/95 | Los Angeles | Sales Associate |
| Year First Employed | 5/93 | | |

Education

Your three most recent degrees. For each degree entered, information is required in each of the two colu red labels. Information in the other columns is helpful.

| Year | Degree | School | Major |
|---|---|---|---|
| March, 1 | Bachelor of Ar | University of California | Speech Communications |
| | | | |
| | | | |

Fig. 6C. (PART 1 OF 3)

Job Goals

Functional Specialties
- Senior Management (CEO Pres, COO, GM)
- Branch & Regional Management
- INFORMATION TECHNOLOGY MANAGEMENT Type of Position: Full Time
Expected Compensation: open
Travel: Moderate (25%-50%)
Relocation: Yes - I can relocate to: Areas most anywhere

About You

Citizenship: U.S. Citizen
Current Clearances: No

Please Help Us

We are curious about how you learned about jobEngine. Please help us by selecting one of the choices

Access Keys

Select an access code and password for future access to your resume.

Resume Access Code: arthur
Password:
Password (again):

Posting

Neither Ziff-Davis nor I-Search is responsible for the verification of data provided and shall not be liable for any errors, factual, transcript otherwise, contained in the information posted. Further, we assume no obligation with respect to the compliance of the information or a process with applicable governmental laws, rules and regulations of any kind regarding employment practices. With respect to confide Ziff-Davis and I-Search will use reasonable measures to delete the applicant's identity, but shall not be responsible for unintentional dis software malfunctions or exposures of applicant through descriptive information contained in the body of the resume.

I accept the agreement, post my resume

---

Your resume text for cutting and pasting information a
Back to Form

---

Processed by i-Search: 151-9000-5279  ─ 12'

Arthur Smith
1234 Main Street
Sausalito, California 94965
Tel: 415-555-5432    Fax: 415-555-5543
E-mail: asmith@isp.com

EXPERIENCE:

*Fig. 6C. (PART 2 OF 3)*

11/96 - 7/97 Relocation Assistance Coordinator
Tokyo Central Agency (TGA Inc.) Tokyo, Japan
Worked in a completely bilingual environment, involved in all aspects of Expa
Conducted various orientations focusing particularly on life in Tokyo assista
other official procedures, house hunting and school arrangements. Constantly
skills in interpretation, translation, negotiation and cultural awareness.

3/95 - 10/96 English Teacher
NCR English Language Institute, Tokyo, Japan
Nova Inter cultural Institute, Tokyo, Japan
Experienced in all aspects of teaching English as a foreign language, includi
T.O.E.F.L. Actively participated in recruitment of new students, student lev
progress analysis. Voted Teacher of the Year by students and upper managemen 8/94 - 2/95 Sales Associate
24'~ Nordstroms Los Angeles, CA
Consistently ranked as highest in customer sales and satisfaction in a compet
environment. Sharpened communicational skills and refined fashion sense gave
privilege of an honest and bright salesperson.

5/93 - 6/94 Resort Hotel Supervisor
Pacific Islands Club, Guam, U. S. A.
Thrived in a resort where the primary focus was to initiate guest interaction
department of sports, entertainment and activities. Assumed direct responsib
sports complex, training the constant influx of new employees, inventory and
introduction of inventive and efficient motivational techniques) and complete

EDUCATION:

Bachelor of Arts - Speech Communications
University of California at Santa Barbara
Graduation:    March, 1993

Major Courses of Study & Interest
Interpersonal Relations, Creative Writing, Psychology, Sociology CERTIFICATES: National Japanese Proficiency Exam - Level 2
  INTERESTS: Travel, Japanese, Scuba Diving, Tennis

{PGCNT}
{PAGE}

Comments, questions or suggestions? Please email us at support@jobEngine.com

——— A ZDNet and I-Search Site ———

  Copyright (c) 1997 jointly by Ziff-Davis (ZDNet) and Interactive Search (I-Search) All rights reserved.  
jobEngine and "Matchmakers for IT Professionals" are joint service marks of Ziff-Davis and
Interactive Search.

*Fig. 6C. (PART 3 OF 3)*

Arthur Smith
1234 Main Street
Sausalito, California 94965
Tel: 415-555-5432  Fax: 415-555-5543
E-mail: asmith@isp.com

⟋ 12

EXPERIENCE:

11/96 - 7/97 Relocation Assistance Coordinator
Tokyo Central Agency (TGA Inc.) Tokyo, Japan
Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

3/95 - 10/96 English Teacher
NCR English Language Institute, Tokyo, Japan
Nova Inter cultural Institute, Tokyo, Japan
Experienced in all aspects of teaching English as a foreign language, including Phonics, and T.O.E.F.L. Actively participated in recruitment of new students, student level assessment and progress analysis. Voted Teacher of the Year by students and upper management.

8/94 - 2/95 Sales Associate
Nordstroms, Los Angeles, CA
Consistently ranked as highest in customer sales and satisfaction in a competitive retail environment. Sharpened communicational skills and refined fashion sense gave customers the privilege of an honest and bright salesperson.

5/93 - 6/94 Resort Hotel Supervisor
Pacific Islands Club, Guam, U. S. A.
Thrived in a resort where the primary focus was to initiate guest interaction in the unique department of sports, entertainment and activities. Assumed direct responsibility for managing the sports complex, training the constant influx of new employees, inventory and ordering of supplies, introduction of inventive and efficient motivational techniques) and complete area maintenance.

EDUCATION:

Bachelor of Arts - Speech Communications
University of California at Santa Barbara
Graduation: March, 1993

Major Courses of Study & Interest
Interpersonal Relations, Creative Writing, Psychology, Sociology CERTIFICATES: National Japanese Proficiency Exam - Level 2

INTERESTS: Travel, Japanese, Scuba Diving, Tennis

*Fig. 7.*

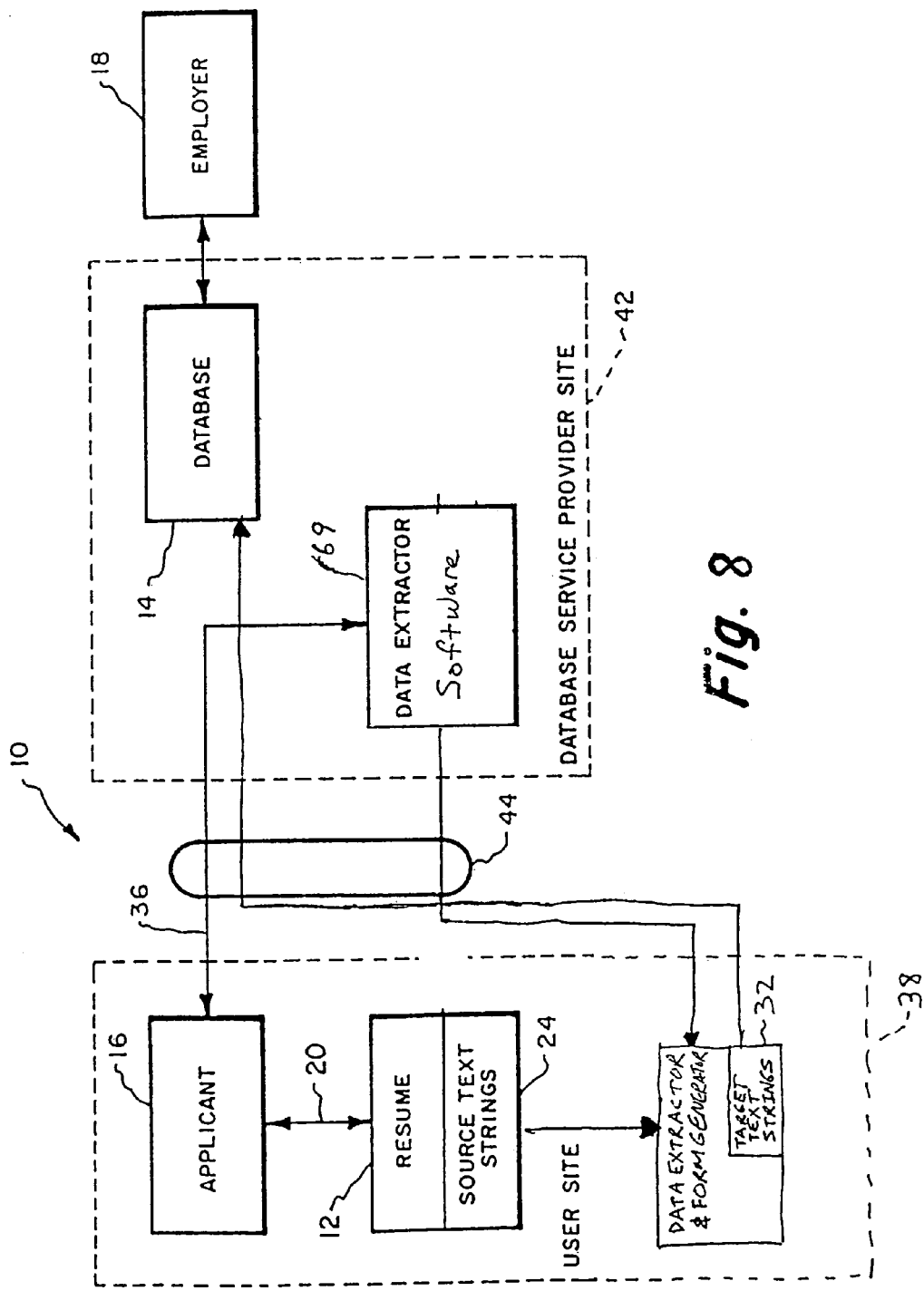

SYSTEM AND METHOD FOR INTERACTIVELY ENTERING DATA INTO A DATABASE

CROSS-REFERENCE TO RELATED APPLICATIONS

This application is a continuation of U.S. application Ser. No. 09/948,408, filed Sep. 6, 2001, now allowed, which is a continuation of U.S. application Ser. No. 09/456,930, filed Dec. 7, 1999, now abandoned, which is a continuation in part of U.S. application Ser. No. 09/019,948, filed Feb. 6, 1998, now U.S. Pat. No. 5,999,939, which claims the benefit of U.S. Provisional Application No. 60/068,404, filed Dec. 21, 1997.

BACKGROUND OF THE INVENTION

The present invention relates to data processing systems for entering information into and accessing information from large structured databases and in particular to those systems which allow multiple independent users to enter information from nonuniformly formatted documents/files and to interact with the system to assure the accuracy of the database entries.

The use of databases for storing data records which can be readily searched is well known. A typical application of large structured databases would be a system for matching jobs and applicants. When used in conjunction with a search engine, a program that can search for matches between inquiry data and data stored within the database, such a system significantly reduces the manual efforts required to match the needs of employers (job providers) and applicants (job seekers). In order to enter applicant data into the database, source documents/files (typically, nonuniformly formatted resume) can be used. Since the format of text data contained within a resume is typically not standardized, text data extraction software is used to retrieve data for entry into the database. Typical of such data extraction software is that described in U.S. Pat. Nos. 5,164,899 and 5,197,004.

SUMMARY OF THE INVENTION

The present invention is directed to a system for facilitating the accurate transfer of information from a source data stream, e.g., a document/file, to a highly structured database and more particularly to such systems capable of accepting nonuniformly formatted documents, e.g., text documents such as resumes, advertisements, and medical records, from a plurality of users via a remote communication interface, e.g., the Internet, and for extracting information therefrom via a procedure which includes user participation to assure the transfer of appropriate entries into the database.

Embodiments of the present invention provide an interactive path for a user (typically, the author of the source document/file) to interactively modify the extracted information. In a preferred embodiment, this interactive path is provided via the Internet and the extracted information can be altered by editing and/or selectively copying portions of the source document/file to supplement and/or modify the extracted information.

A preferred system for facilitating the accurate transfer of information from each of a plurality of nonuniformly formatted source data streams into a structured database comprises (1) means for supplying digital data representing each of a plurality of source data streams from a plurality of users, each source data stream containing data corresponding to multiple discernible source data strings, (2) data extraction means for extracting selected ones of the source data strings and generating related target data strings, (3) means for displaying a structured form comprised of multiple fields, each field capable of accommodating a data string and wherein one or more of the fields have the target data strings inserted within, (4) means for enabling each user to modify the target strings inserted within the displayed form corresponding to the source data stream originating from the user before accepting the form, and (5) means for storing data corresponding to the data strings from the form fields into the database.

In a further aspect of the present invention, the providing means uses a remote communication interface, preferably using the Internet, to supply the source document/file to the data extraction means and, subsequently, to return the form having target data strings within its fields.

An additional embodiment of the present invention also comprises a means for providing one or more supplemental inquiry forms to a user, receiving data strings in response to the supplemental inquiry forms, and for providing the data strings back to the user along with the target data strings in a structured form.

In a further aspect of the present invention, the providing means enables a user to submit digital data in the form of an audio stream. Data processing includes the conversion of the audio stream to a text string. The text string is then processed in the same manner as a user submitted source string containing text.

In an alternative embodiment of the present invention, the providing means uses traditional mail to supply the source document/file to the data extraction means. Alternatively, the data extraction means, structured form generating means, supplemental inquiry form generator, and structured form editing means are supplied to the user's computer as a self executing piece of software.

The novel features of the invention are set forth with particularity in the appended claims. The invention will be best understood from the following description when read in conjunction with the accompanying drawings.

BRIEF DESCRIPTION OF THE DRAWINGS

FIG. 2 is a portion of the exemplary resume of FIG. 7, showing the extraction of source text strings based on the syntax of surrounding text;

FIG. 3 is a diagram of the structure of an exemplary database comprised of a plurality of applicant data records;

FIGS. 6A-6C show exemplary forms for providing resume and/or supplementary data to the database service provider of FIG. 1; and FIG. 7 shows an exemplary resume used in conjunction with the forms of FIGS. 6A-6C.

FIG. 8 comprises a simplified block diagram of a system for entering resume data into a database and interactively modifying and/or supplementing such entered data using software stored on a user's computer.

DESCRIPTION OF THE PREFERRED EMBODIMENTS

The present invention is directed to a system for facilitating the accurate transfer of information from a source data stream, e.g., a document/file, to a highly structured database and more particularly to such systems capable of accepting nonuniformly formatted documents, e.g., text documents such as resumes, from a plurality of users via a remote communication interface, e.g., the Internet, and for extracting information therefrom via a procedure which includes user participation to assure the transfer of appropriate entries into the database.

In a preferred embodiment of the present invention, the system is used to place nonuniformly formatted advertisements into a structured database. In an additional embodiment of the present invention, the system is used to place nonuniformly formatted medical records into a structured database.

Embodiments of the present invention provide an interactive path for a user (typically, the author of the source document/file) to interactively modify the extracted information, e.g., according to the source document/file. In a preferred embodiment, this interactive path is provided via the Internet and the extracted information can be altered by editing and/or selectively copying portions of the source document/file to supplement and/or modify the extracted information.

Figure 1:
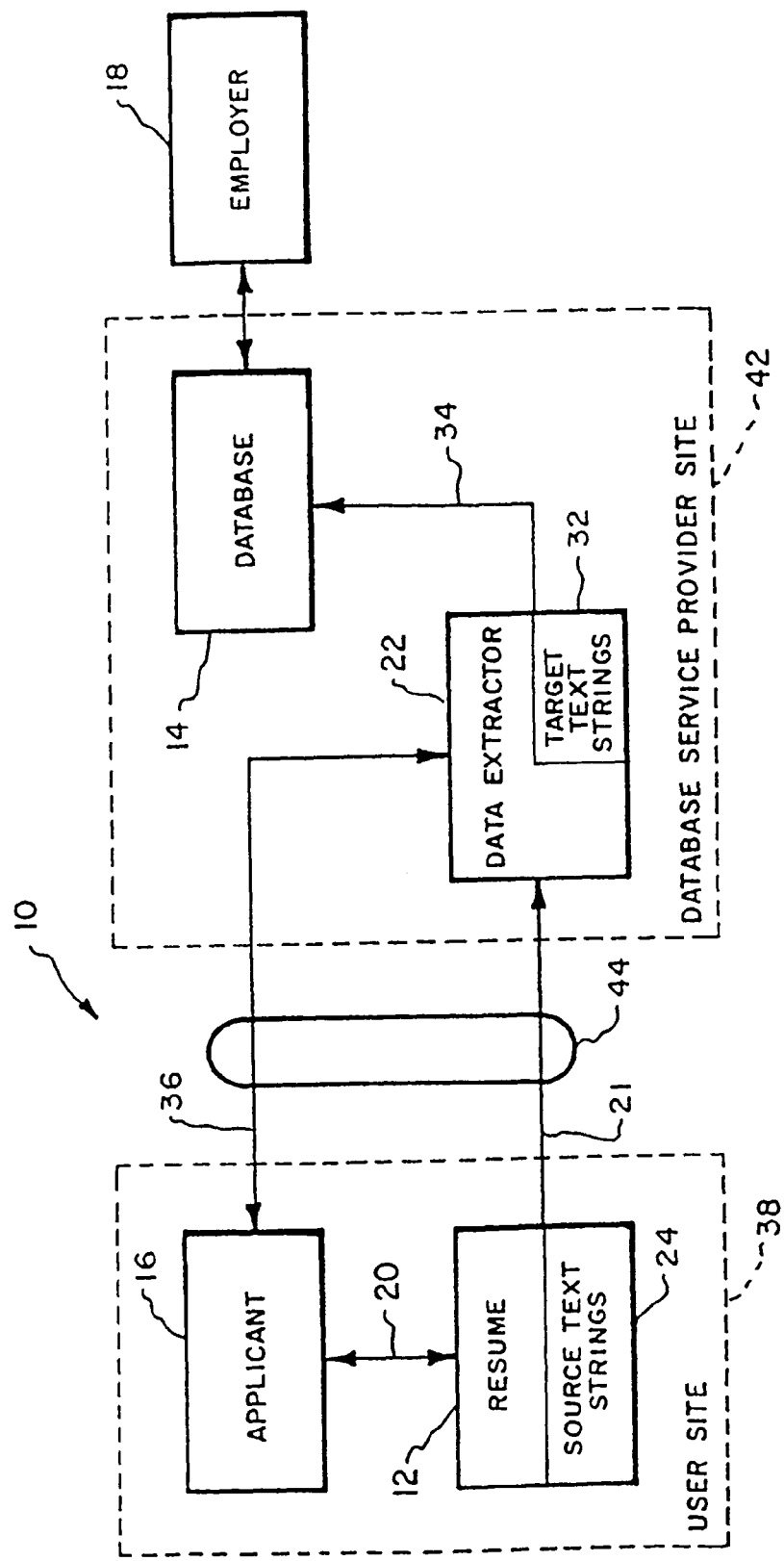
FIG. 1 comprises a simplified block diagram of a system for entering resume data into a database and interactively modifying and/or supplementing such entered data.

FIG. 1 comprises a simplified block diagram of a system 10 for entering data from a source data stream 12, e.g., a text document/file such as a resume, into a database 14 and interactively modifying and/or supplementing such entered data. In an exemplary job search environment, the interactive system 10 provides an improved system and method for accurately transferring information from resume source document/file 12, hereinafter referred to as resumes and preferably independently generated by a plurality of applicants 16, to the database 14 where it is accessible (preferably via a search engine as described further below) to one or more employers 18. Resumes are preferably used as the source documents/files 12 in this environment since resumes are a well-accepted tool for providing information from an applicant to an employer and, as such, they typically already exist.

As shown in FIG. 1, the resume 12 is typically generated via path 20 using a word processor (not shown). Interactions between the applicant 16 and resume 12 typically continue via the word processor until a satisfactory resume 12 is generated and stored as corresponding digital data. However, resumes are generally nonstructured or loosely structured (and nonuniformly formatted between users) text documents that are only intended to be human readable e.g., by the employer 18 and the applicant 16, and are typically not directly useable in the highly structured database 14. Consequently, the resume 12 is supplied via path 21 to a data extractor 22, preferably implemented as text data extraction software (e.g., the DEFT software developed by TRW as part of their InfoWeb™ system), to selectively convert information from the format of the unstructured (or loosely structured) resume 12 to the format of the highly structured database 14. Essentially as shown in FIG. 2 (a portion of the exemplary resume of FIG. 7), the data extractor 22 isolates one or more discernible source data strings, e.g., text data strings 24, within the resume 12 and, according to the content of the source data strings, e.g., 24a-24z, and using the syntax of surrounding keyword data, e.g., text strings 26, determines a correlation between source text strings 24 and data fields 28 that are to be entered into the database 14. For example, the keyword text string 26 ("EXPERIENCE") identifies the following source text strings 24 as being related to the applicant's job experience due to the syntax of the surrounding text, e.g., the keyword "experience", the existence of dates, the identification of a company (Inc.), etc.

As shown in FIG. 3, an exemplary applicant database 14 is comprised of a plurality of fixed length records 30, each corresponding to a different one of a plurality of applicants 16. Each record 30 is comprised of a plurality of data fields 28 having predefined formats and lengths, corresponding to searchable pieces of information.

Table I shows an exemplary partial list of definitions of the information stored in the data fields 28 of the database 14 of FIG. 3.

TABLE I

| Data Field | Definition |
| --- | --- |
| 28j | Most recent job start date |
| 28k | Most recent job end date |
| 28l | Most recent job company |
| 28m | Most recent job title |
| 28n | Next job start date |
| 28o | Next job end date |
| 28p | Next job company |
| 28q | Next job title |

First, the data extractor 22 extracts source data strings, e.g., text strings 24a-2d, from the resume 12. Optionally, the text format of one or more of the source text strings 24 are then altered by the data extractor 22 to generate target data strings, e.g., text strings 32, of a standardized format. For example, a date text string could be standardized (e.g, Mar. 12, 1993 could be changed to 3/12/93). Otherwise, the stored target text string 32 is essentially identical to the source text string 24. As described further below, each target text string 32 preferably directly corresponds to the data fields 28 in the database 14 (e.g., the target string 32 corresponding to source text string 24a corresponds to 28j) and thus, following the modification acceptance process described below, target text strings 32 are stored via path 34 into the database 14 (following any conversions required by the format of the database 14 and its fields 28).

However, due to lack of structure of the resume 12, the data extractor 22 (also referred to as a natural language processor) is susceptible to making an incomplete or erroneous correlations. Accordingly, the present invention provides an interactive path 36 that enables the applicant 16, generally the individual most acquainted with the contents of the resume 12, to modify the target text strings 32 to best correspond to the resume 12 and, thus, enhance the accuracy of the data stored in the database 14.

Figure 4:
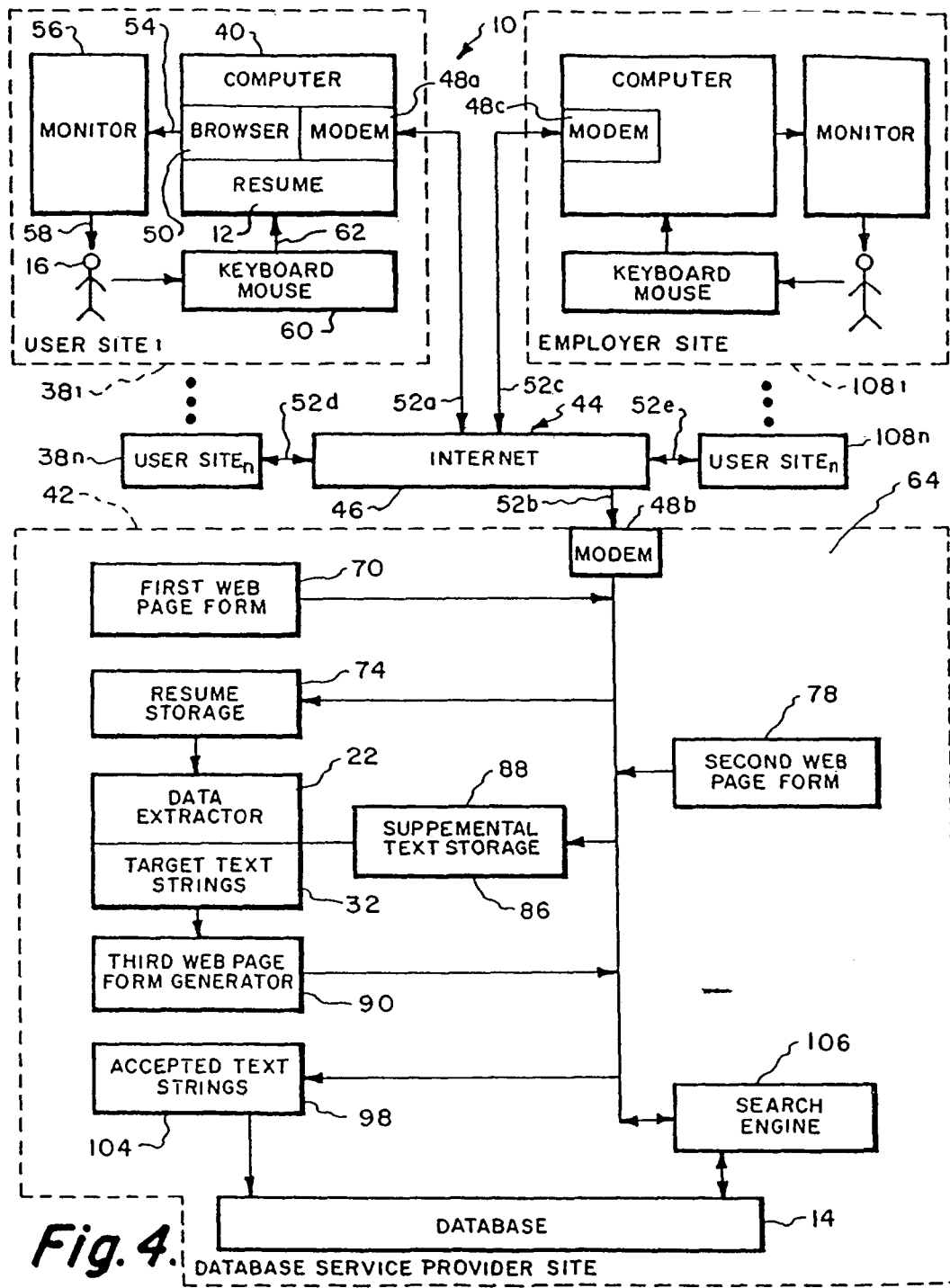
FIG. 4 comprises an expanded block diagram of the flow of the data entry system of FIG. 1.

FIG. 4 is an expanded block diagram of the system 10 of FIG. 1 showing the data flow which enables each user (i.e., applicant 16 in this exemplary environment) to interact with the information extracted by the data extractor 22 and thus assure the accurate transfer of information from the resume 12 into the structured database 14. The interactive system 10 is preferably comprised of one or more user sites 38 (including a computer 40 operated by the applicant 16) and a database service provider site 42 (generally an automated service) coupled to each other via a remote communication interface 44. In the following discussion, the remote communication interface comprises the Internet 46, the associated hardware and/or software at the user 38 and database service provider 42 sites, typically comprising a modem 48 and a web (Internet) browser 50, and the associated interconnections 52 between (typically phone lines and Internet Service Providers (ISPs)). However, other communication interfaces, e.g., a local area network (LAN) or a direct modem to modem or serial port to serial port connections, are also considered to be alternative remote communication interfaces.

Preferably, each user site 38 is comprised of the computer 40, e.g., a personal computer, having a display control output 54 that drives a display monitor 56 to generate a displayed output 58 and a data entry device, e.g., a keyboard/mouse 60, that directs operation of the computer 40 via control path 62. In contrast, while the database service provider site 42 may typically also include a monitor and a keyboard/mouse, it only requires a computer 64 that interfaces to the Internet 46.

Figure 5:
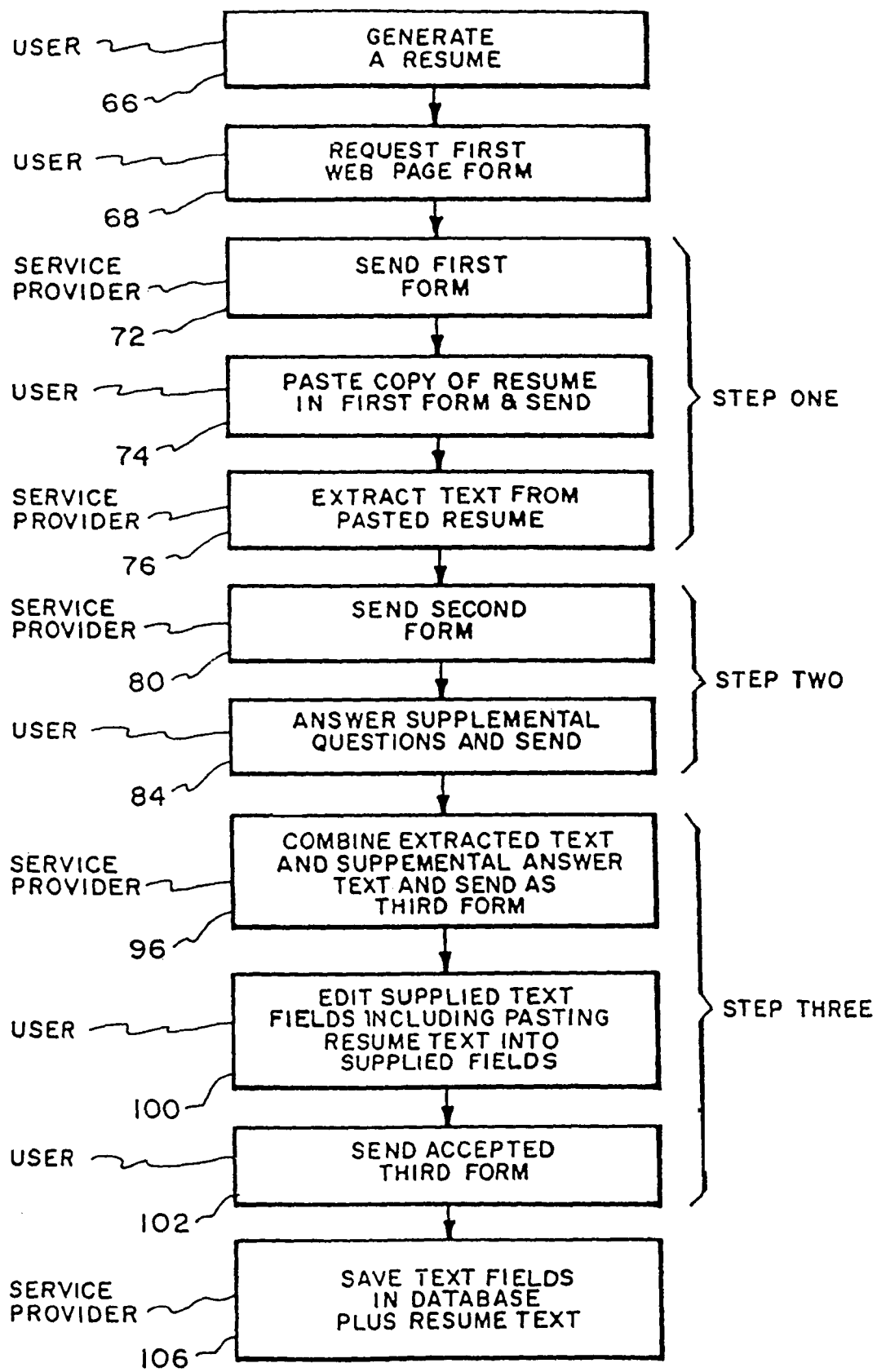
FIG. 5 comprises a simplified flow chart of the data entry flow of FIG. 4.

Initially, the user 16 at user site 38 generates the source document/file, i.e., resume 12, at step 66 of FIG. 5. As previously discussed, this generation is interactive and proceeds until user 16 is satisfied with the results. However, the resulting resume 12 is generally unstructured relative to the highly structured form of the database 14.

As a next step, the user 16 requests a first web page form (step 68) via the Internet 46 to begin the process of interactively transferring the resume 12 to the database 14. The first web page form 68 (see FIG. 6A) is stored (see block 70) within computer 64 at the database service provider site 42 and is responsively provided back (see step 72) to the user site 38 via the Internet 46 (commencing STEP ONE) and displayed by the web browser 50 on the monitor 56. The user 16 then preferably provides the existing resume 12 back to the database service provider site 42 via a pasting operation used in conjunction with the web browser 50. In an exemplary Windows 95 environment, the user 16 launches the word processor, e.g., Microsoft. Word, that had been used to generate the resume 12. Preferably, the user 16 then selects the entire resume document and copies it to the clipboard. Next, the user 16 pastes the resume 12 from the clipboard into a source data input field 70 of the first web page form 68 using the web browser 50, e.g., Microsoft Internet Explorer. Typically, this pasting removes any word processor formatting information and results in digital data (preferably formatted as ASCII text) representing the resume 12 being stored in the web browser 50. (Alternatively, the word processor formatting information can be extracted by the data extractor 22.) The web browser 50 is then used to send (see step 74) the first web page form 68 (now containing the resume 12) to the database service provider site 42 where the resume 12 is stored in resume storage 74. The data extractor 22 then extracts one or more source text strings 24 according to syntactical rules to establish a correspondence between the source text strings 24 (preferably saved as intermediary target text strings 32) and fields 28 of the database 14.

Next, STEP TWO of the process commences by the computer 64 at the database service provider site 42 sending a second web page form 78 (see FIG. 6B) at step 80 which is displayed via the web browser 50 on the monitor 56 at the user site 38. In this example, the second web page form 78 is a supplemental inquiry form, that asks the user 16 one or more supplemental questions. In response, the user 16 fills in supplemental fields 82, e.g., by a pull-down field, free text entry, a radio selection, etc. This filled-in form is sent back to the database service provider 42 in step 84 where supplemental text strings 86 are stored in supplemental text storage 88.

STEP THREE of the process commences by the third web page form generator 90 at the database service provider site 42 generating a third web page form 92 (see FIG. 6C), a structured form having multiple fields 94 each field being capable of accommodating a text string within. Specifically, target text strings 32 (corresponding to source text strings 24) are inserted within fields 94 according to the syntax of the source document/file 12 and the definition (e.g., name, address, city, etc) of each field 94. Additionally, the supplemental text strings 86 are inserted within the associated fields 94 of form 92. Preferably, the stored resume 12' from resume storage 74 is also added to the third web page form 92. Finally, the third web page form 92 is sent back in step 96 to the user site 38 where it is displayed by the web browser 50 on monitor 56.

The user 16 can now use the view the displayed form 92 to determine its accuracy. If the displayed data, including target text strings 32 and supplemental text strings 86, are accurate the user 16 sends back form 92 to the database service provider site 42 where the accepted text strings are extracted in block 98 and stored in database 14. However, as previously discussed, the displayed data is not always accurate. Accordingly, the user 16 can edit data supplied in the third web page form 92 (preferably including using the supplied resume 12) to cause the fields 94 of form 92 to more accurately represent the applicant's resume information. Using features of the web browser 50, the user 16 can in step 100 edit fields 94 and/or paste information from resume 12' (now part of form 92) to modify the data fields 94. The user in step 102 then sends the modified form 92 back to the database service provider site 42 where accepted text strings 104 from fields 94 are stored in the database 14 in step 98.

As an example of the modification process, it is noted that field 94n corresponding to the third "Company" under "Experience" has been filled in with the target text string 32 "Los Angeles". This is inaccurate since the data extractor 22 has apparently missed the company name, i.e., Nordstroms, and instead extracted the city name as the target text string 32. Therefore, the user/applicant 16 can identify this inaccuracy and either (1) edit the field 94n by typing in the correct entry or (2) select the source text string 24' from the copy 12' of resume 12 included on the third web page form and paste the proper text (Nordstroms) into field 94n. Accordingly, the user/applicant 16 has been given the opportunity to verify and correct the data before entering it into the database 14, thus assuring the accurate transfer of information into the database 14.

Once the information has been stored in the database 14, a search engine 106, preferably a software program that executes on the computer 64 at the database service provider site 42, can be used to match inquiries, e.g., from one or more employer sites 108 (preferably via the remote communication interface 44) to look for applicants 16 with specific attributes. For example, since the highly structured database 14 contains fields 28 corresponding to the schools attended by each applicant 16, the search engine 106 can, in response to a request from the employer site 108, search for applicants 16 who graduated from specific schools or any other criteria stored in the fields 28 of the database 14.

In another embodiment of the current invention, the user 16 at user site 38 generates an audio file to be used as the source file, i.e., resume 12, at step 66 of FIG. 5. The ability to submit an audio file may be particularly helpful to those who have difficulty typing or who prefer to dictate. The user 16 proceeds through the same series of steps as previously described, except that instead of cutting and pasting resume text from some type of word processor into the first web page form 68, the user 16 attaches the audio file via an attachment operation in conjunction with the web browser 50. The user 16 then uses the web browser 50 to send the first web page form 68 (now containing the resume 12 as an audio file) to the database service provider site 42 where the audio file is stored in resume storage 74.

Once received by the database service provider site 42 a speech to text conversion program is used to convert the audio file attached to first web page form 68 into a text file 12. The text file 12 is also stored in resume storage 74. The text file is then used the same way a user generated text file 12 is used as described above to generate an entry in database 14.

In another embodiment of the invention (see FIG. 8) the text extractor, supplemental question page generator, structured form generator, and structured form editor is supplied to the user's computer 40 as an applet or other self executing piece of software 69 by the database service provider. A speech to text conversion program may also be supplied to the user's computer 40. The provision of the software 69 may be done through a remote communication interface, such as the Internet. The applet or software 69 may use a web browser as an interface or it may have its own independent user interface.

Figure 9:
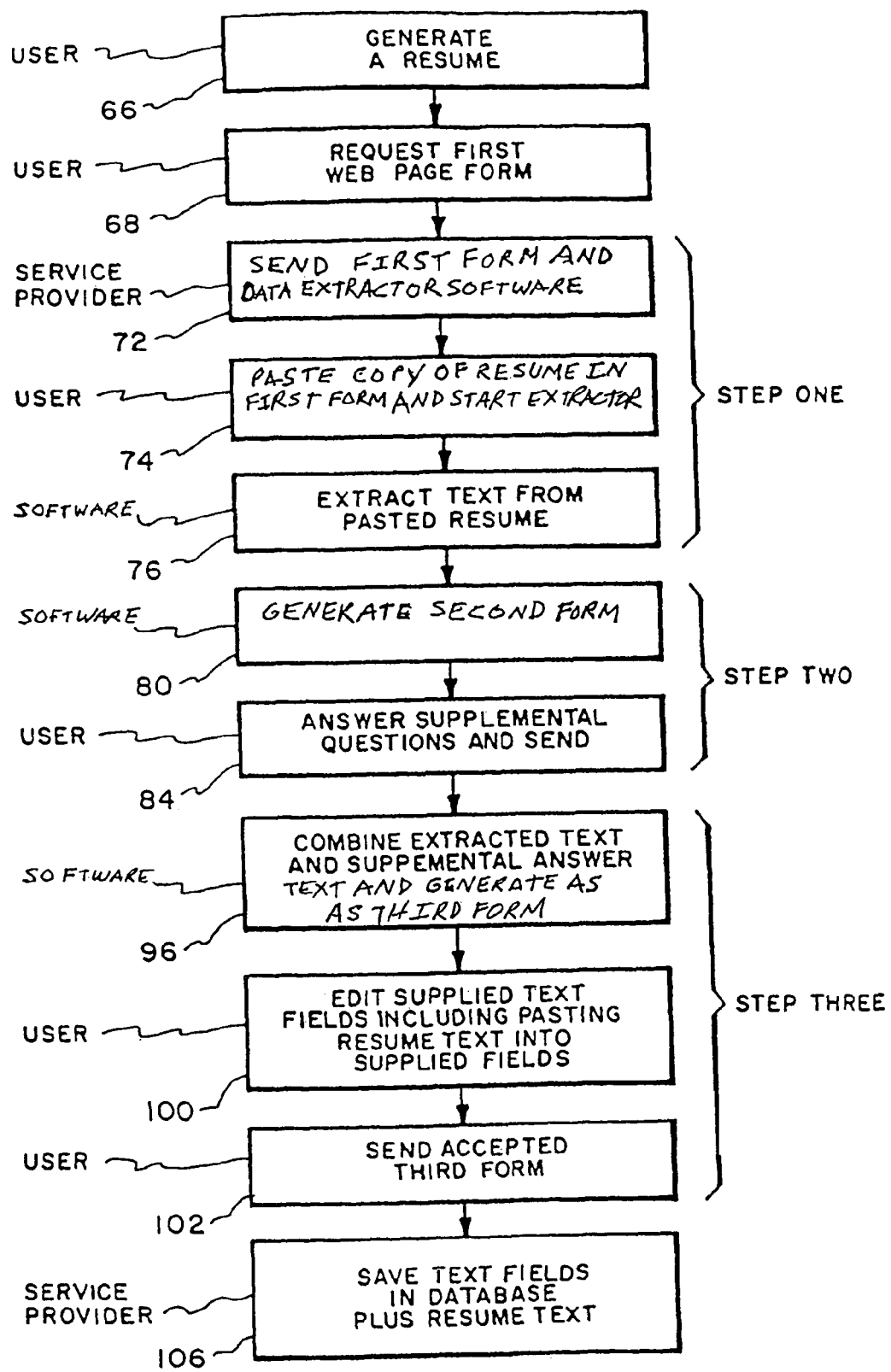
FIG. 9 comprises a flow chart of the data entry system of FIG. 8.

Initially, the user 16 at user site 38 generates the source document/file, i.e., resume 12, at step 66 of FIG. 9. As previously discussed, this generation is interactive and proceeds until user 16 is satisfied with the results. In this embodiment however, the resume generation process can either be carried out using another word processor or through the supplied software 69 itself.

As a next step, the user 16 requests a first web page form and the associated software 69 (step 68) via the Internet 46 to begin the process of interactively transferring the resume 12 to the database 14. The first web page form 68 (see FIG. 6A) and the associated software 69 is stored (see block 70) within computer 64 at the database service provider site 42, and is responsively provided back (see step 72) to the user site 38 via the Internet 46 (commencing STEP ONE), and displayed by the web browser 50 on the monitor 56.

The user 16 then preferably provides the existing resume 12 into the software 69 either by entering it directly or via a pasting operation used in conjunction with the web browser 50.

Next, STEP TWO of the process commences by the software on the users computer 40 which generates a second form 78 (see FIG. 6B) at step 80 which is displayed on the monitor 56 at the user site 38. In this example, the second form 78 is a supplemental inquiry form, that asks the user 16 one or more supplemental questions. The number of supplemental questions can vary depending on the contents of the resume 12. In response, the user 16 fills in supplemental fields 82, e.g., by a pull-down field, free text entry, a radio selection, etc. This filled-in form is submitted to the software 69 in step 84 where the supplemental text strings 86 are stored by the software 69 to some type of recordable media as supplemental text storage 88.

STEP THREE of the process commences by the software 69 on the user's computer 40 generating a third form 92 (see FIG. 6C), a structured form having multiple fields 94, each field being capable of accommodating a text string within. Specifically, target text strings 32 (corresponding to source text strings 24) are inserted within fields 94 according to the syntax of the source document/file 12 and the definition (e.g., name, address, city, etc.) of each field 94. Additionally, the supplemental text strings 86 are inserted within the associated fields 94 of form 92. Preferably, the stored resume 12' from resume storage 74 is also added to the third form 92. The third web page form 92 is displayed by the web browser 50 on monitor 56.

The user 16 can now use the software 69 to view the displayed form 92 to determine its accuracy. If the displayed data, including target text strings 32 and supplemental text strings 86 are accurate, the user 16 sends back form 92 using the software to the database service provider site 42 via the Internet, where the accepted text strings are extracted in block 98 and stored in database 14. However, as previously discussed, the displayed data is not always accurate. Accordingly, the user 16 can edit data supplied in the third form 92 (preferably including using the supplied resume 12) to cause the fields 94 of form 92 to more accurately represent the applicant's resume information. Using features of the web browser 50, the user 16 can in step 100 edit fields 94 and/or paste information from resume 12' (now part of form 92) to modify the data fields 94. The user in step 102 then uses their browser to send the modified form 92 back to the database service provider site 42 using the software where accepted text strings 104 from fields 94 are stored in the database 14 in step 98.

In another embodiment of the invention the text extractor, structured form generator, supplemental question page generator, and structured form editor is supplied to the user's computer as self executing piece of software 69 by the database service provider. In this embodiment the user would not need to have an Internet connection at all. The user contacts the database service provider using for example e-mail, telephone or traditional mail requesting the software 69. The software 69 is sent to the user on portable storage media through traditional mail and is executable as a stand alone program on the user's computer 40.

The functionality is similar to the above embodiments except that once the process is complete the user is prompted to save the completed resume 12 to portable storage media. The user then sends the storage media to the database service provider using traditional mail. Once received, the database service provider takes the resume 12 off of the portable storage media and places the resume contents into the database 14.

Although the present invention has been described in detail with reference only to the presently-preferred embodiments, those of ordinary skill in the art will appreciate that various modifications can be made without departing from the invention. For example, while a job search environment has been primarily described, the present invention can be useful in other environments where the source document is essentially unstructured relative to a highly structured database. Accordingly, the invention is defined by the following claims.

The invention claimed is:

1. A method for facilitating the accurate transfer of information to a structured database, said method comprising the steps of:

receiving, via a remote communication interface, digital data from a plurality of job applicants, said digital data representing one or more source data streams comprising resume data, each said source data stream containing digital data corresponding to one or more discernible source data strings in said resume data, wherein said digital data includes a first digital data that is personal information about a first job applicant of said plurality of job applicants;

extracting selected ones of said source data strings from said one or more source data streams and generating related target data strings;

sending, via said remote communication interface, a structured form to said first job applicant, said structured form comprising multiple fields, each field being capable of accommodating a data string and wherein any said generated target data strings are inserted;

enabling said first job applicant to modify and/or accept said target data strings inserted within said structured form;

receiving, via said remote communication interface, digital data from said first job applicant corresponding to said target data strings from said structured form fields; and receiving, via said remote communication interface in response to providing one or more inquiry forms, one or more data strings from said first job applicant to supplement said source data strings selected for extraction from said one or more source data streams; and sending, via said remote communication interface to said first job applicant, said structured form comprising one or more fields having said one or more data strings inserted within.

2. The method of claim 1, wherein said one or more inquiry forms comprises one or more questions directed to said first job applicant.

3. The method of claim 1, wherein said remote communication interface uses the Internet.

4. The method of claim 1, wherein said structured form additionally comprises said source data stream and said enabling step includes enabling said first job applicant to copy selected portions of said one or more source data streams into selected fields of said structured form.

5. The method of claim 1, wherein one or more of said target strings are essentially equivalent to said extracted source data strings.

6. The method of claim 1, additionally comprising:
receiving, via said remote communication interface, from said first job applicant a response comprising said one or more fields filled in by said first job applicant responsive to said one or more inquiry forms directing one or more supplemental questions to said first job applicant.

7. A system for facilitating the accurate transfer of information to a structured database, said system comprising:
means for receiving, via a remote communication interface, digital data from a plurality of job applicants, said digital data representing one or more source data streams comprising resume data, each said source data stream containing data corresponding to one or more discernible source data strings in said resume data, said digital data including at least first digital data generated by and received from a first job applicant of said plurality of job applicants;

data extraction means for extracting selected ones of said source data strings from said source data streams and generating related target data strings;

means for generating a structured form, said structured form comprising multiple fields, each field capable of accommodating a data string and wherein any said generated target data strings are inserted;

means for sending, via said remote communication interface, said structured form to said first job applicant means for enabling said first job applicant to modify said target data strings inserted within said structured form; and means for receiving, via said remote communication interface, digital data corresponding to said target data strings from said structured form fields;

means for receiving, via said remote communication interface in response to providing one or more inquiry forms, one or more data strings from said first job applicant to supplement said source data strings selected for extraction from said one or more source data streams; and means for sending, via said remote communication interface to said first job applicant, said structured form comprising one or more fields having said one or more data strings inserted within.

8. The system of claim 7, wherein said means for receiving said digital data comprises each said job applicant sending said digital data via said remote communication interface.

9. The system of claim 7, wherein said remote communication interface uses the Internet.

10. The system of claim 7, wherein said means for sending said structured form additionally comprises means for returning said structured form via said remote communication interface.

11. The system of claim 7, wherein said remote communication interface comprises a browser.

12. The system of claim 7, wherein said means for enabling includes means for enabling each said job applicant to copy selected portions of said one or more source data streams into selected fields of said structured form.

13. The system of claim 7, wherein one or more of said target strings are essentially equivalent to said extracted source data strings.

14. The system of claim 7, additionally comprising:
means for receiving, via said remote communication interface, from said first job applicant a response comprising said one or more fields filled in by said first job applicant responsive to said one or more inquiry forms directing one or more supplemental questions to said first job applicant.

15. A system for facilitating the transfer of information, said system comprising:
a communication interface for receiving digital data from a plurality of job applicants from each of one or more user sites, said digital data representing one or more source data streams comprising resume data, each said source data stream comprising digital data corresponding to one or more discernible source data strings in said resume data received from a respective job applicant who generated a respective source data stream;

a data extractor for extracting selected source data strings from said one or more source data streams and generating related target data strings, and for returning said target data strings to said one or more user sites;

a generating apparatus for generating a structured form, said structured form comprising multiple fields, each field capable of accommodating a data string and wherein one or more of said fields have said target data strings inserted within; and a data entry apparatus for enabling each respective job applicant to alter said fields of said structured form corresponding to said respective source data stream originating from said respective job applicant before accepting said structured form; and wherein said data entry apparatus enables, via said communication interface in response to providing one or more inquiry forms, receiving one or more data strings from said respective job applicant to supplement said source data strings selected for extraction from said one or more source data streams; and wherein said communication interface sends to said respective job applicant said structured form comprising one or more fields having said one or more data strings inserted within.

16. The system of claim 15, wherein said communication interface uses the Internet.

17. The system of claim 15, wherein said structured form comprises said respective source data stream and said data entry apparatus enables said respective job applicant to copy selected portions of said respective source data stream into selected fields of said structured form.

18. The system of claim 17, wherein said data extraction apparatus additionally returns said respective source data stream to its corresponding job applicant who generated said respective source data stream.

19. The system of claim 15, wherein one or more of said target data strings are essentially equivalent to said extracted source data strings.

20. A method for facilitating the accurate transfer of information to a structured database, said method comprising the steps of:
receiving, via a remote communication interface, digital data from one or more job applicants, said digital data representing one or more source data streams comprising resume data, each said source data stream containing digital data corresponding to one or more discernible source data strings in said resume data, wherein said digital data includes a first digital data that comprises personal information about a first job applicant of said one or more job applicants;
extracting selected ones of said source data strings from said source data streams and generating related target data strings;
sending, via said remote communication interface, a structured form to said first job applicant, said structured form comprising multiple fields, each field being capable of accommodating a data string and wherein any said generated target data strings are inserted;
enabling said first job applicant to modify and/or accept said target data strings inserted within said structured form;
receiving, via said remote communication interface, digital data from said first job applicant corresponding to said target data strings from said structured form fields;
enabling, via said remote communication interface, a user to access at least a portion of said target data strings modified and/or accepted by said first job applicant
receiving, via said remote communication interface in response to providing one or more inquiry forms, one or more data strings from said first job applicant to supplement said source data strings selected for extraction from said one or more source data streams; and
sending, via said remote communication interface to said first job applicant, said structured form comprising one or more fields having said one or more data strings inserted within.

21. The method of claim 20, further comprising a step of storing said target data strings modified by said first job applicant into a structured database.

22. The method of claim 20, further comprising a step of storing said target data strings accepted by said first job applicant into a structured database.

23. The method of claim 20, further comprising a step of allowing said second user to identify said first job applicant based on a matched inquiry.

24. A method of facilitating the accurate transfer of resume information from a source data stream to a structured database, said method comprising:
permitting a first job applicant to author a resume employing a word processing application;
permitting the first job applicant to transmit the resume electronically to a processing computer system from the first job applicant's computer system;
receiving, at the processing computer system over a remote communication interface, the resume containing personal information, wherein the resume includes personal information generated by and received from the first job applicant;
extracting data strings from the received resume and generating related target data strings, wherein the related target data strings comprise information extracted from the resume, at least one of the related target data strings including personal information extracted from the resume;
transmitting, over a remote communication interface to the first job applicant's computer system, at least a portion of the related target data strings;
permitting the first job applicant to accept the at least a portion of the related target data strings;
permitting the first job applicant to modify the at least a portion of the related target data strings;
receiving, at the processing computer system over a remote communication interface, modified data strings from the first job applicant;
receiving, via said remote communication interface in response to providing one or more inquiry forms, one or more data strings from the first job applicant to supplement the related target data strings extracted from the received resume; and
sending, via said remote communication interface to the first job applicant, the portion of the related target data strings having said one or more data strings.

25. The method according to claim 24, further comprising an act of storing information extracted from the resume in the database.

26. The method according to claim 24, further comprising an act of initiating an interactive session between the first job applicant's computer system and the processing computer system, and the interactive session includes the acts of receiving a resume, transmitting at least a portion of the related target data strings to a first job applicant, and receiving modified target data strings from the first job applicant.

27. The method according to claim 26, further comprising an act of concluding the interactive session in response to receiving modified data strings from the first job applicant.

28. The method according to claim 27, wherein the act of concluding the interactive session occurs in response to receiving all modified data strings from the first job applicant.

29. The method according to claim 24, wherein a location of the first job applicant's computer system is remote to a location of the processing computer system.

30. The method according to claim 29, further comprising an act of initiating an interactive session between the first job applicant's computer system and the processing computer system, and wherein the interactive session includes the acts of receiving a resume, transmitting at least a portion of the related target data strings to a first job applicant, and receiving modified target data strings from the first job applicant.

31. The method according to claim 30, wherein in the act of initiating the interactive session includes an act of initiating the interactive session over the Internet.

32. A method of facilitating the accurate transfer of resume information from a source data stream to a structured database, said method comprising:
permitting a first job applicant to author a resume employing a word processing application;
accepting, at a processing site, a connection request through a remote communication interface from the first job applicant initiated through a user interface displayed on a computer system;
transmitting, through the remote communication interface over a computer network to the first job applicant, a data extractor software, wherein the data extractor software is adapted to extract data strings from the resume and to generate related target data strings, wherein the related target data strings comprise information extracted from the resume, at least one of the related target data strings including personal information of the first job applicant extracted from the resume;

permitting the first job applicant to review and/or modify at least a portion of the related target data strings;

receiving, at the processing site remote from the first job applicant over a remote communication interface, reviewed target data strings and any modified data strings from the first job applicant;

receiving, via said remote communication interface in response to providing one or more inquiry forms, one or more data strings from said first job applicant to supplement said related target data strings extracted from the received resume; and sending, via said remote communication interface, to said first job applicant the portion of the related target data strings having said one or more data strings.

33. The method according to claim 32, further comprising an act of storing information from the resume in a database.

* * * * *